United States Patent
Sundquist

(10) Patent No.: US 8,286,590 B2
(45) Date of Patent: Oct. 16, 2012

(54) HUMMINGBIRD FEEDING SYSTEM

(76) Inventor: Heidi Sundquist, Oak Run, CA (US)

(*) Notice: Subject to any disclaimer, the term of this patent is extended or adjusted under 35 U.S.C. 154(b) by 202 days.

(21) Appl. No.: 12/778,375

(22) Filed: May 12, 2010

(65) Prior Publication Data

US 2011/0277691 A1    Nov. 17, 2011

(51) Int. Cl.
*A01K 39/02* (2006.01)
(52) U.S. Cl. .......................................... 119/72; 119/57.8
(58) Field of Classification Search .................... 119/72, 119/72.5, 77, 61.53, 661–662, 52.2, 57.8; 222/166, 478–479, 481–482; 47/48.5, 79, 47/81; D30/121, 124, 130, 131, 133
See application file for complete search history.

(56) References Cited

U.S. PATENT DOCUMENTS

| | | | | |
|---|---|---|---|---|
| 2,267,883 A * | 12/1941 | Wood | ............................. | 119/77 |
| 3,777,714 A * | 12/1973 | Danielsson | ..................... | 119/75 |
| 4,441,458 A * | 4/1984 | Mercil | ......................... | 119/57.9 |
| 5,247,904 A * | 9/1993 | Anderson | ....................... | 119/72 |
| 5,507,249 A * | 4/1996 | Shaw | .............................. | 119/72 |
| 5,924,382 A * | 7/1999 | Shumaker | ..................... | 119/72 |
| 6,092,699 A * | 7/2000 | Schmidt | ........................ | 222/479 |
| 6,145,477 A * | 11/2000 | Jansen | ......................... | 119/416 |
| 2006/0124067 A1* | 6/2006 | Taylor | ............................ | 119/72 |

* cited by examiner

*Primary Examiner* — Rob Swiatek
*Assistant Examiner* — Ebony Evans
(74) *Attorney, Agent, or Firm* — Donald R. Boys; Central Coast Patent Agency, Inc.

(57) ABSTRACT

A hummingbird feeding station includes a first hollow body having a closed end and an openable end, the first hollow body for receiving and for containing a liquid for consumption, one or more openings extending through at least one wall of the first hollow body for enabling consumption of the liquid contained therein, and a second hollow body having a closed or a sealed end and an open end, the second hollow body for receiving and containing a liquid. The second hollow body is disposed between the first hollow body a point of origin of insects attempting to access the liquid in the first hollow body, the liquid contained in the second hollow body functioning as a barrier preventing the insects from accessing the liquid contained in the first hollow body.

3 Claims, 2 Drawing Sheets

Section AA

HUMMINGBIRD FEEDING SYSTEM

BACKGROUND OF THE INVENTION

1. Field of the Invention

The present invention is in the field of bird feeding equipment and stations and pertains particularly to methods and apparatus for preventing terrestrial insects from invading a humming bird feeding station.

2. Discussion of the State of the Art

In the art of bird feeding, many types of bird feeders exist on the market. Hummingbird feeders are arguably the more popular and better selling systems of the class which includes various types of seed feeders.

Hummingbird feeders are typically hollow bodied vessels that are designed to contain and hold a sweet liquid resembling nectar that local hummingbirds may feed on through special access points around the hollow body. The access points for consuming the liquid held within the feeder are typically fashioned to resemble flowers or the like having petals and in some cases sporting a landing area or apparatus like a perch.

Hummingbird feeders are often hung from the eve of a house or from a tree or other structure so that the liquid is high off the ground and easily accessible to flying birds that may hover about or light on the feeder to consume the liquid. One problem with hanging or posted feeders is that terrestrial insects nearby such as an ant colony, for example, will detect the scent of the liquid within the feeder and will eventually discover how the liquid may be accessed. In most cases the insects climb down the cord, wire, or other hanging member and access the external body of the feeder. From there they find the access points to the liquid and begin consuming the liquid. In severe cases, the insects end up clogging the access points requiring premature maintenance of the feeder to clear out the insects and to refill with fresh liquid.

Therefore, what is clearly needed is a hummingbird feeding station that reduces or prevents terrestrial insects from accessing the liquid within the feeder.

SUMMARY OF THE INVENTION

The problem stated above is that clear unobstructed feeding is desirable for a hummingbird feeding system, but many of the conventional means for hanging a hummingbird feeding station such as by rope or wire, also create access to the consumable liquid within the hummingbird feeding station to insects such as ants. The inventors therefore considered functional components of a humming bird feeding system, looking for elements that that could potentially be harnessed to provide access to consumable liquid within the feeding station but in a manner that would not create an avenue for unwanted pests to gain access to the consumable liquid within the feeding station.

The present inventor realized in an inventive moment that if, at the point of stationing a hummingbird feeding system, consumable liquid within the feeding station could be protected from access by terrestrial insects, significant conservation of work might result. The inventor therefore constructed a unique extension arrangement for a hummingbird feeding station that allowed hummingbirds to easily gain access to the consumable liquid within the feeding station, but constrained or prevented terrestrial insects such as ants from gaining access to the liquid. A significant conservation of work results, with no impediment to intended access to the consumable liquid within the feeding station created.

Accordingly, in an embodiment of the present invention, a hummingbird feeding station is provided and includes a first hollow body having a closed end and an openable end, the first hollow body for receiving and for containing a liquid for consumption, one or more openings extending through at least one wall of the first hollow body for enabling consumption of the liquid contained therein, and a second hollow body having a closed or a sealed end and an open end, the second hollow body for receiving and containing a liquid. The second hollow body is disposed between the first hollow body a point of origin of insects attempting to access the liquid in the first hollow body, the liquid contained in the second hollow body functioning as a barrier preventing the insects from accessing the liquid contained in the first hollow body.

In one embodiment the liquid contained in the second hollow body is water. In one embodiment the closed end of the second hollow body is closed by a seal that functions to prevent the liquid from draining through a small opening in the body. In one embodiment, the hummingbird feeding station is suspended from above by a linear member. In this embodiment the linear member is one or a combination of a line, a wire, a cord, a pole, or a rod. In one embodiment the hummingbird feeding station is positioned above the ground by a linear member. In this embodiment the linear member is a pole, a rod, a dowel, or a post.

In one embodiment the second hollow body is fixedly attached to a first linear member extending from the first hollow body and fixedly attached to a second linear member extending from a point of origin of insects attempting to access the liquid in the first hollow body. In one embodiment where the second hollow body has a sealed end, the linear member extends longitudinally through the second hollow body. In one embodiment the second hollow body is centered over the linear member using one or more positioning plates affixed to the inside wall or walls of the second hollow body the plate or plates having a center opening just larger than the outside diameter of the linear member.

In all embodiments the second hollow body filled with liquid provides a barrier to ants attempting to traverse the linear member to the first hollow body. In one embodiment where the second hollow body has a sealed end, the seal is annular and resilient having an inside diameter smaller than the linear member, the inside diameter sealing against the linear member and an outside diameter larger than the diameter of the small opening in the second hollow body, the outside diameter sealing off the opening. In one embodiment the hummingbird feeding station further includes a port through the wall of the second hollow body, the port coupled to a source of liquid larger in volume than the second hollow body.

According to another aspect of the present invention, a method for preventing insects from accessing a hummingbird feeding station is provided comprising the steps (a) integrating a hollow body having a closed or a sealed end and an openable end to a linear member extending from the hummingbird feeding station to a point of origin of insects attempting to access the feeding station, and (b) filling the hollow body of step (a) with liquid.

In one aspect of the method, in step (a) the hollow body is cylindrical and the linear member is a line, a wire, a cord, a pole, or a rod. In another aspect of the method, in step (a) the linear member is a pole, a rod, a dowel, or a post. In one aspect, in step (a) the hollow body is attached by forcing the linear member through the hollow body and sealing the opening around the linear member to prevent leakage.

In one aspect of the method, in step (b) liquid is introduced into the hollow body through a sealable port disposed through the wall of the body. In one aspect, in step (b) the liquid is water. In one aspect of the method, a step (c) is provided for maintaining the level of liquid within the hollow body by way of a source of liquid larger in volume than the hollow body, the liquid source communicating with the hollow body via a delivery hose.

BRIEF DESCRIPTION OF THE DRAWING FIGURES

DETAILED DESCRIPTION

The inventor provides a hummingbird feeding station that reduces or eliminates invasion of the feeding ports by terrestrial insects such as ants. The methods and apparatus of the present invention are described in enabling details using the following examples, which may represent more than one embodiment of the invention.

Figure 1:
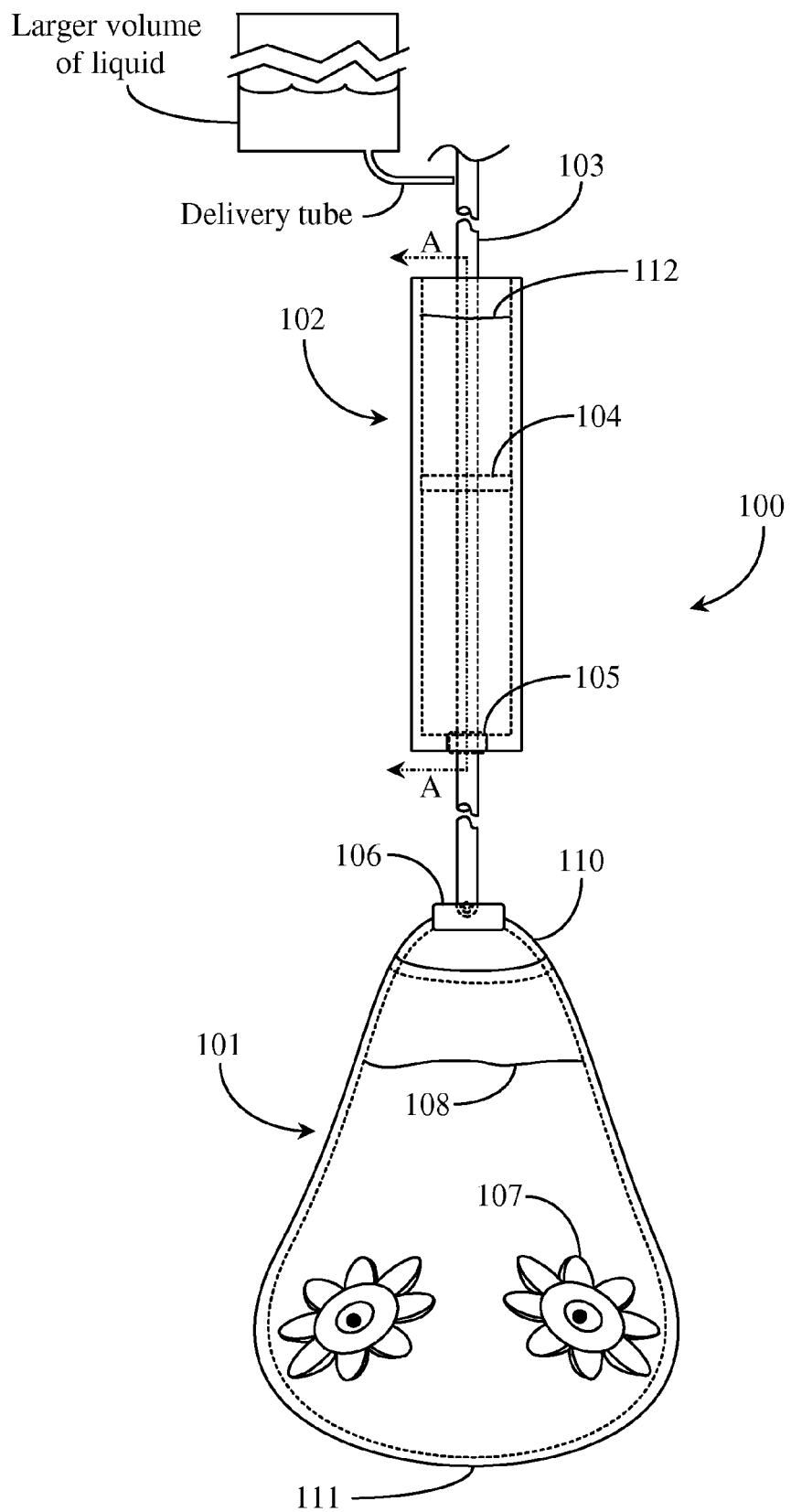
FIG. 1 is an elevation view of a hummingbird feeding station according to an embodiment of the present invention.

FIG. 1 is an elevation view of a hummingbird feeding station 100 according to an embodiment of the present invention. Hummingbird feeding station 100, hereinafter referred to a feeding station 100 includes a first hollow body 101 adapted as a feeder. Feeder 101 is shaped like a pear in this example however feeders are available in a variety of shapes and sizes. Feeder 101 representative of a first of two hollow bodies has a closed bottom end 111 and an openable top end 110. Top end 110 may be a threaded lid that may be unscrewed from feeder 101 so that consumable liquid such as hummingbird feeder solution may be added to the feeder.

Feeder 101 includes two or more feeding points or access points 107 for enabling access to the solution inside to hummingbirds. In this example, the access points 107 are shaped like flowers. Other shapes and themes may be used without departing from the spirit and scope of the present invention. In this example, feeder 101 is adapted to be suspended from a structure like the eve of a house, an overhang, or a tree limb. In an alternate embodiment hummingbird feeding station 100 may be elevated from the ground by a rod, post, dowel, or pole. In this example feeder 101 is filled with a consumable fluid 108.

Lid 110 of feeder 101 has an attachment interface 106 attached or contiguously formed thereto. Attachment interface 106 may be adapted by inset pin or other mechanism to accept attachment of a linear member 103 used, in this case, to suspend feeder 101 from an overhead structure like an eve, overhang, tree limb, or other structure. Linear member 103 may be one or a combination of a line, a wire, a cord, a pole, or a rod.

Hummingbird feeding station 100 includes a second hollow body 102 positioned between feeder 101 and an eve, overhang, or some other overhead structure. Hollow body 102 serves as an obstacle or barrier to terrestrial insects that may attempt to infiltrate feeder 101 through access points 107. Body 102 may be formed of glass, ceramic, metal, polymer or some other durable material. Body 102 has a lower end that is mostly closed but has a small opening protected by a seal 105. Seal 105 may be an annular silicone or rubber seal having an inside diameter just smaller that the outside diameter of linear member 103 and an outside diameter just smaller than the opening through the end of the body.

Hollow body 102 may be cylindrical or of some other shape without departing from the spirit and scope of the present invention. Seal 105 enables a user to attach hollow body 102 to linear member 103 by threading the linear member through the hollow body whereby the seal causes compression against the linear member and the opening in the hollow body effectively sealing in liquid 110. In one embodiment, hollow body 102 has a closed bottom end and no opening or seal 105 is present. In this case linear member 103 would not extend past the bottom wall of body 102. A second linear member might be provided to connect feeder 101 inline with body 102. Attachment hardware may vary without departing from the spirit and scope of the present invention.

Hollow body 102 includes a centering plate 104 for centering the body with respect to the linear member such that the linear member is held significantly away from the inside wall (cylindrical body) or walls (symmetrical body). Centering plate 104 is disposed within hollow body 102 at a position that remains submerged beneath liquid 112 when the body is full. For the invention to work effectively, liquid such as water must be kept at a level above centering plate 104.

In practice of the invention, a user integrates or otherwise attaches hollow body 102 onto the linear member suspending feeder 101 at a position above the feeder and beneath the overhead structure that the feeder is suspended from. The user then fills the feeder with a consumable liquid and fills the second body 102 with water or another liquid designed as a barrier to terrestrial insects. Seal 105 prevents liquid 112 from escaping hollow body 102. Terrestrial insects such as ants may travel down linear member 103 toward feeder 101. At the location atop hollow body 102, the ants are prevented from continuing by liquid 112. Centering plate 104 keeps the inside wall of body 102 away from linear member 103 and the body is sufficiently large so the insects cannot leap from the linear member to the inside wall of body 102.

Figure 2:
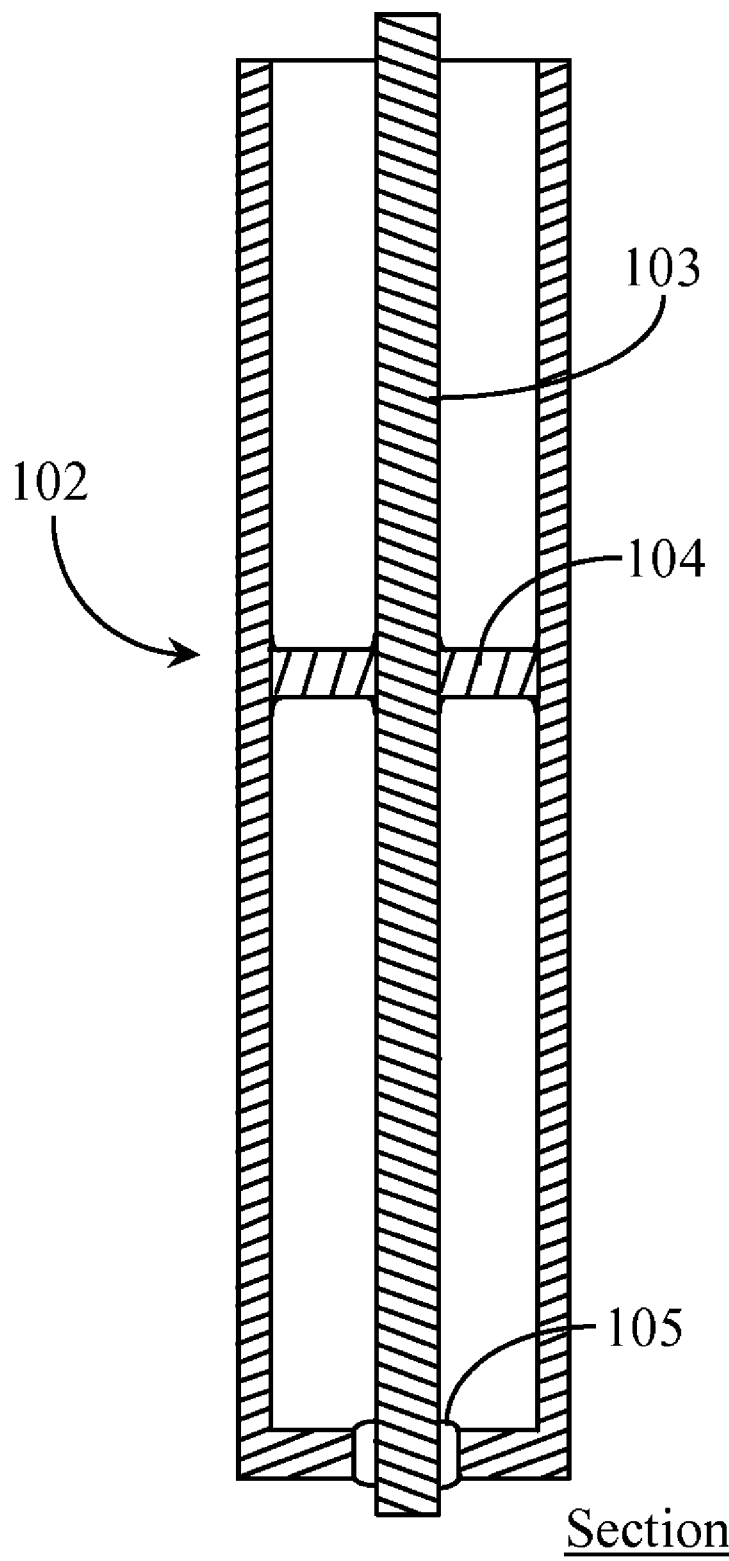
FIG. 2 is a section view of the second hollow body of FIG. 1 according to an embodiment of the present invention.

FIG. 2 is a section view of the hollow body 102 of FIG. 1 taken along section line AA according to an embodiment of the present invention. Hollow body 102 is made of plastic, glass, metal, or some other durable material. In this example, body 102 is cylindrical and of sufficient diameter to leave enough space between linear member 103 and the inside wall of body 102 to provide an effective barrier for insects when body 102 is filled with water or some other liquid.

Centering plate 104 has an opening provided therethrough that is just large enough to allow linear member 104 to slip through. In one embodiment linear member 103 attaches to centering plate 104 but does not extend past the centering plate. In that embodiment the bottom of the cylindrical body 102 is closed with no opening or seal. Centering plate 104 may contain one or more cutouts or openings that allow liquid to pass the centering plate such that the entire volume of the hollow body is filled with liquid. Centering plate 104 may be welded to the inside wall of body 102. In one embodiment centering plate 104 is glued to the inside wall of body 102. In one embodiment the centering plate is only attached to the linear member. In this case the centering plate has an outside diameter that is just smaller than the inside diameter of the hollow body. In one embodiment more than one centering plate may be used.

In one embodiment of the present invention, a port (not illustrated) is provided through the wall of hollow body 102 so that a separate delivery system might be used to fill hollow body 102 and to keep it filled to a suitable level. A larger volume of liquid might be provided and stationed somewhere near by and a delivery tube might be connected between the larger volume of liquid and the hollow body where the liquid comes into the hollow body through the port. In a variation of this embodiment the larger volume of water might be stationed above the hollow body wherein the liquid for filling the body is dispensed down the linear member and enters the hollow body through the open end. In this case there is no port on the hollow body.

The embodiment illustrating a hummingbird feeder should not be construed as a limitation of the invention. In one embodiment the hollow body barrier 102 may be used with a seed feeder or another type of feeding system where the consumable matter is attractive to terrestrial insects.

It will be apparent to one with skill in the art that the hummingbird feeding system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A hummingbird feeding station comprising:
    a conventional hummingbird feeder having an attachment interface at an upper end connected to a linear suspension member;
    a barrier hollow body having a lower end with an annular seal and an open upper end; and
    a volume of water with a connected delivery tube;
    wherein the linear suspension member passes from the attachment interface through the annular seal at the lower end of the barrier hollow body, and through the barrier hollow body extending from the upper end, and the volume of water with the connected delivery tube delivers water to the linear suspension member above the barrier hollow body, dispensing water down the linear suspension member to the barrier hollow body.

2. The hummingbird feeding station of claim 1 wherein the linear suspension member is one or a combination of a line, a wire, a cord, a pole, or a rod.

3. The hummingbird feeding station of claim 1 wherein the barrier hollow body is centered over the linear suspension member using one or more positioning plates affixed to the inside wall or walls of the second hollow body the plate or plates having a center opening just larger than the outside diameter of the linear member.

* * * * *